United States Patent [19]

Iwamoto

[11] Patent Number: 4,775,002

[45] Date of Patent: Oct. 4, 1988

[54] DELIVERING EQUIPMENT HAVING HEAT INSULATING FUNCTION WHICH IS UTILIZED IN DELIVERING ARTICLES SUCH AS FOOD

[75] Inventor: Hidechika Iwamoto, Tokyo, Japan

[73] Assignee: Mitsui & Co., Ltd., Tokyo, Japan

[21] Appl. No.: 814,660

[22] Filed: Dec. 30, 1985

[30] Foreign Application Priority Data

Jul. 5, 1985 [JP] Japan .............................. 60-102523
Aug. 26, 1985 [JP] Japan .............................. 60-129840

[51] Int. Cl.$^4$ ........................... F25D 3/00; F24H 7/00
[52] U.S. Cl. ........................................ 165/47; 165/902; 165/919; 165/10; 62/457; 126/400; 206/499; 206/509; 312/214; 312/236
[58] Field of Search ................. 165/918, 919, 47, 902, 165/10; 62/457; 126/400, 273.5; 206/499, 509; 220/42

[56] References Cited

U.S. PATENT DOCUMENTS

| | | | |
|---|---|---|---|
| 3,811,559 | 5/1974 | Carter | 220/4 D |
| 3,856,178 | 12/1974 | Norgaard | 206/499 |
| 3,859,819 | 1/1975 | Kaplan | 62/457 |
| 4,026,351 | 5/1977 | Biava | 165/918 |
| 4,077,390 | 3/1978 | Stanley et al. | 126/400 |
| 4,182,405 | 1/1980 | Hysen et al. | 165/918 |
| 4,240,272 | 12/1980 | Tiede et al. | 62/457 |

FOREIGN PATENT DOCUMENTS 2925499 1/1981 Fed. Rep. of Germany ........ 62/457

Primary Examiner—Albert W. Davis, Jr.
Attorney, Agent, or Firm—Wegner & Bretschneider

[57] ABSTRACT

A delivering equipment with heat insulating function according to the present invention is utilized in delivering food and so on and comprises an insulated receptacle made of insulating material for storage of food and the like, a concave formed in the bottom portion within the receptacle for storage of regenerating means, and regenerating means disposed in the concave. The regenerating means is preferably comprised of a transparent case packed with regenerating material which contains higher fatty acid as a main content. The regenerating material may be of 100% of behenic acid and preferably contain 10% of cured castor oil so as to depress the solidification point of the regenerating material. Further, a delivering equipment with heat insulating function according to the present invention comprises an insulating receptacle for storage of food and so on and a heat panel with heat pipes disposed within the receptacle so as to equalize the temperature distribution in the receptacle. In case of a delivering equipment with keeping warm function heat source of the heat pipes is regenerating means for heating disposed in the concave which is formed in the bottom portion within the receptacle.

Whereas, in case of a equipment with keeping cold function, heat source of the heat pipes is regenerating means for cooling disposed in the concave which is formed in the upper portion within the receptacle.

4 Claims, 10 Drawing Sheets

DELIVERING EQUIPMENT HAVING HEAT INSULATING FUNCTION WHICH IS UTILIZED IN DELIVERING ARTICLES SUCH AS FOOD

BACKGROUND OF THE INVENTION

1. Field of the Invention

The present invention relates to a delivering equipment having heat insulating function and in more detail, to a delivering equipment used in delivering and/or storing articles such as food which is needed to be under desired temperature. Preferably, the equipment of the present invention is used in an aircraft.

2. Description of the Prior Art

This kind of container has been generally used which is provided with means for heating or refrigerating food stored in the receptacle thereof. One of those has been proposed by the applicant of the present invention wherein the receptacle is provided with the concave for storage of heat generating means. The bottom of the concave is found with the hole communicating the concave with another container which has the same construction and is positioned under the former container (Japanese Utility Model Publication No. 18986/1982). With respect to heat generating material contained in the heat generating means generally known is one with, for example, polyethylene glycol as its main content (refer to Japanese Patent Publication No. 53375/1981) or stearyl alcohol as its main content.

However, the container of the type disclosed in Japanese Utility Model Publication No.18986/1982, which is provided with heat generating means producing heat by oxidizing reaction of heat generating material therein, requires provision of the through hole conveying air to the heat generating means, which causes the problem of decrease in the effective capacity of the container.

On the other hand, it is known that preservation of food is preferably carried out in the condition of below 10° C. or over 65° C. Where food is preserved under a high temperature, inside of the insulated receptacle of the container must be heated to be maintained in the temperature of over 65° C. However, where polyethylene glycol or stearyl alcohol is used as a main heat generating material of the heat generating means, solidification point thereof is relatively low (about 59° C. in case of steary alcohol, whereas about 55° C. in case of polyethylene glycol) and therefore, it is difficult to obtain heat capacity sufficient for preservation of food in a high temperature over 65° C. In other words, the portion around heat generating means within the insulated receptacle may be maintained at over 65° C. whereas the temperature of corners of the receptacle is by about 6° C.–7° C. lower than that in the portion around heat generating mans and can be less than 65° C.

Further, in the conventional container, heat generated from the heat generating means is transmitted by convection, which causes a difference in heat distribution within the container. The result is that unless heat capacity of heat generating means is increased sufficiently, inside of the container cannot be maintained in a desired temperature range, which creates a problem of decrease in cost-efficiency and effective capacity of the container.

SUMMARY OF THE INVENTION

The object of the present invention is to provide a delivering equipment with heat insulating function which does not need to have any hole for inducing air for heat generating means.

Another object of the present invention is to provide a delivering equipment with heat insulating function which is provided with heat generating means having high solidification point.

Another object of the present invention is to provide a delivering equipment which is able to heat the space within an insulated receptacle rapidly and equaly.

Further, still another object of the present invention is to provide a delivering equipment which is able to refrigerate the space within an insulated receptacle rapidly and equaly.

For achieving above objects, a delivering equipment with heat insulating function according to the present invention comprises an insulated receptacle, a concave formed in the bottom of said receptacle for storage of regenerating means, and regenerating means disposed in said concave, said regenerating means being comprised of a transparent case packed with regenerating material containing higher fatty acid as a main content. Preferably, higher fatty acid is behenic acid According to the above arrangement, regenerating means is utilized instaed of heat generating means so that any hole can be avoided for inducing air. Regenerating material may be comprised of behenic acid only. It is preferable that solidification point of regenerating material is raised by adding cured castor oil by weight of about 10%.

According to the delivering equipment with above mentioned arrangement, the space within the insulated receptcal can be used effectively because air-supply to regenerating means is unnecessary.

Further, the solidification point of regenerating material becomes 75° C. to 76° C. because it contains behenic acid as a main content (and its purity is 85%). Accordingly, regenerating material generates a large amount of heat in a relatively small volume, the result is that the temperature within the insulated receptacle can be maintained over 65° C. as well as the effective capacity of the receptacle can be increased.

Further, in the delivering equipment of the present invention, the receptacle may be made of insulating material or attached insulating material on the outer or inner surface thereof, and a panel with heat pipes may be disposed therein so as to equalize the temperature inside of the receptacle. For the attachment of the panel to the receptacle, as will be described in a preferred embodiment with reference to drawings, the panel is preferably formed into a tubular structure with rectangular cross section so as to insert into the receptacle. Alternatively, the panel of tubular structure with rectangular cross section may be an inner panel used in forming the receptacle.

According to the delivering equipment with above arrangement, heat is conducted through the heat pipes, so that the air within the receptacle is heated or cooled by contact with the panel and the temperature of each position within the receptacle is equalized. If regenerating material for cooling (such as dry-ice or ice) or that for heating is disposed in the receptacle, the heat from the regenerating material for cooling or heating is rapidly transmitted to each portion within the receptacle via the panel provided with the heat pipes, so that the temperature of each portion within the receptacle is equalized. The conduction of heat within the receptacle can be made efficiently without fail even when the convection of the air is interrupted by food and so on stored in the receptacle, because the conduction of heat does not need to depend on the convection of air as in the conventional equipment.

Therefore, regenerating means with relatively small heat capacity can be sufficient for cooling or heating food stored in the receptacle, which is economic and is able to minimize the decrease in the effective capacity of the receptacle.

BRIEF DESCRIPTION OF THE DRAWING

The above and other objects and effects of the invention will be apparent from the following description taken in connection with the accompanying drawing wherein:

FIG. 1 is a front view with part cut away,

FIG. 2 is a side view partly showing a sectional view and

FIG. 3 is a perspective view showing an attachment sturcture of a door panel;

FIG. 4 is a sectional view and

FIG. 5 is a perspective view showing a heat panel disposed in a receptacle;

DESCRIPTION OF THE PREFERRED EMBODIMENT (Example I)

Figure 1:
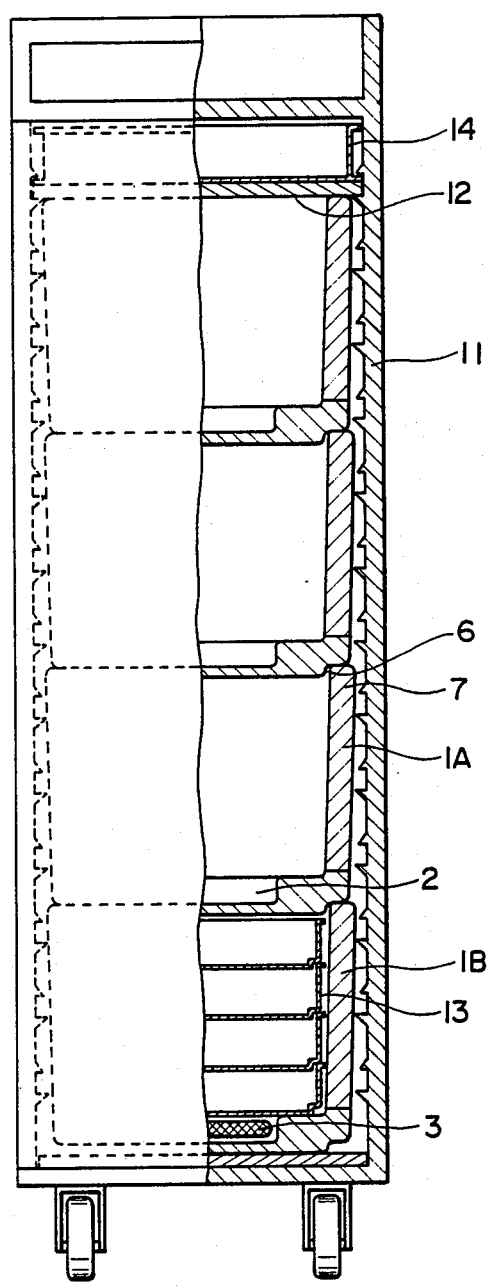
FIGS. 1 to 3 are illustrating a preferred embodiment of the present invention.
Figure 2:
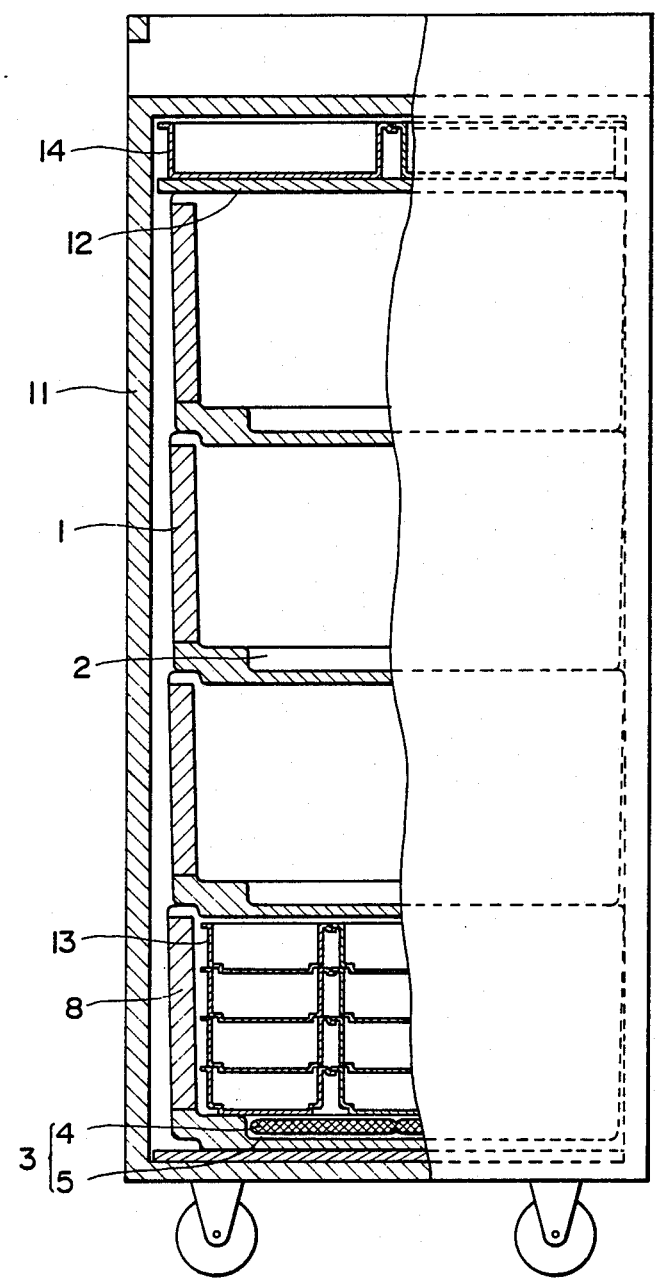
Figure 3:
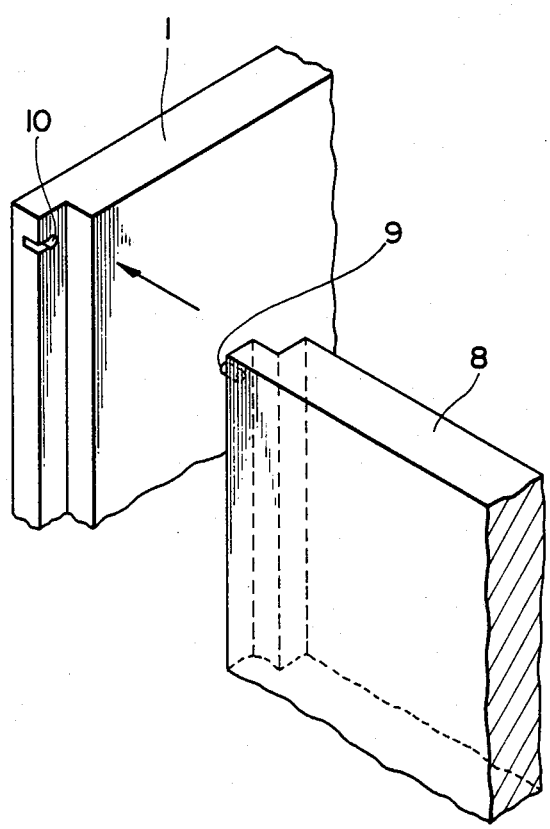

FIGS. 1 to 3 illustrate a preferred embodiment according to the present invention, in which each insulatd non-lid receptacle 1 has a concave 2 in the bottom thereof as shown in the drawings. The concave 2 is provided with regenerating means 3 for heating. The regenerating means 3 is comprised of a transparent polycarbonate case 5 wherein regenerating material 4 is contained. The material 4 comprises 90% of behenic acid purity: 85%) and 10% of cured castor oil.

On the bottom surface of the insulated receptacle 1, a groove 6 is formed which can be mated with a marginal end 7 of another receptacle downwordly positioned. The receptacle 1 has a door 8 at one side (as shown in FIG. 2). Speaking specifically, the door 8 has pins 9 at both side ends which are projected transversely in the opposite direction and removably inserted into respective recesses 10 formed on the side ends of the adjacent walls as shown in FIG. 3.

In the drawings, reference numeral 11 denotes a cart wherein plural receptacles 1 are disposed in a piled condition. Reference numeral 12 denotes an insulated lid, numeral 13 denotes individual trays which are disposed in the receptacle 1 and numeral 14 denotes a tray for what is not needed to be kept warm such as knives and other tablewares.

The regenerating material 4 contained in the regenerating means 3 can be dissolved by hot water and the like. The transparent case 5 is made of polycarbonate so that the case will not be frosted at the time of high temperature and the condition of the regenerating material 4 can be seen through the case 5 during the dissolution of the material 4.

In addition, the regenerating material 4, the coagulating temperature of which is about 80° C., generates a large amount of heat and therefore, the lowest temperature in the receptacle 1 can be maintained over 65° C. even when the regenerating material of relatively small amount is used. Furthermore, each insulated 1 has the door 8 at one side so that content can be taken out from a desired insulated receptacle selected from those piled on.

(Example II)

Figure 4:
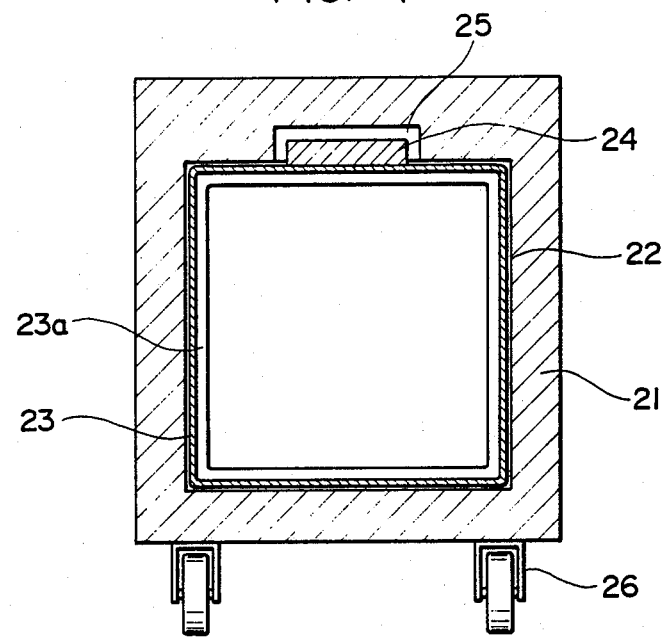
FIGS. 4 and 5 are illustrating another embodiment of the invention, where
Figure 5:
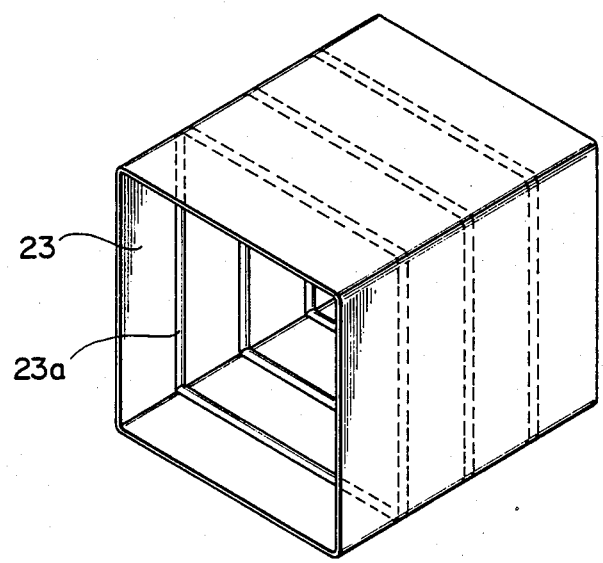

FIGS. 4 and 5 illustrate another preferred embodiment of the present invention. As illustrated in the drawings, a panel 23 provided with heat-pipes 23a is attached to inner surface 22 of a container 21 which is made of heat insulating material and has one side wall removably attached thereto. The container 21 has a storage room 25 for regenerating means for cooling at the upper portion therein and the regenarating means for cooling 24 is stored in the storage room 25. Reference numeral 26 in the drawing denotes a caster. The panel 23 is formed into a tubular structure with rectangular section and is provided with plural loops of heat-pipes at the inner surface thereof. Further, the heat-panel 23 is removably inserted into the container 21.

Further, heat-panel 23 may be disposed on all of the inner surfaces of the container 21. The caster is not indispensable to the present invention.

Figure 6:
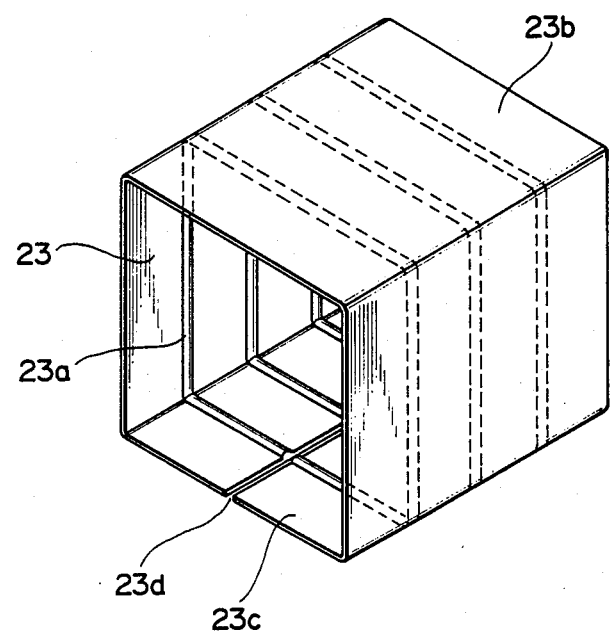
FIG. 6 is a perspective view showing another heat panel.

FIG. 6 illustrates alternative example of panel 23 in which panel 3 has a narrow groove 23d in the wall 23c opposite to the wall 23b which is positioned under the regenerating means.

Figure 7:
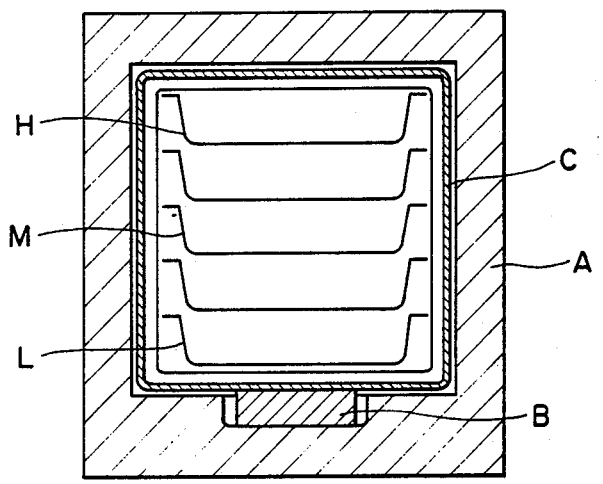
FIG. 7 is a sectional view showing a container of the invention.

On the other hand, in case of the container with function to keep warm, the concave is disposed in the bottom of the container shown in FIG. 7 and the regenerating means for heating is stored therein.

Next, the comparison tests of the efficiency for keeping warm(cold) between the container A1 according to this embodiment and the conventional container A2 will be described.

Figure 8:
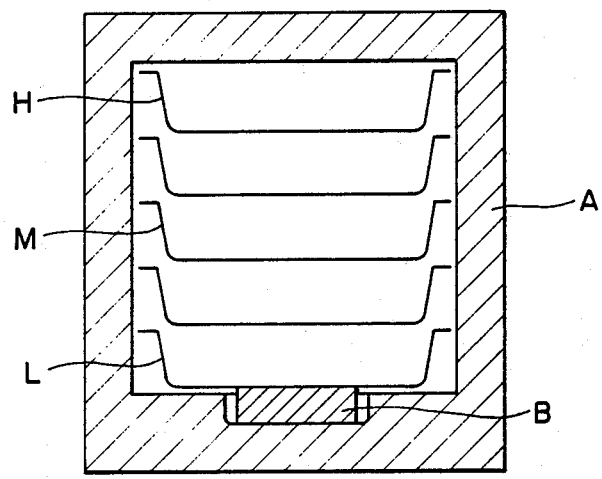
FIG. 8 is a sectional view showing a conventional container.
Figure 9:
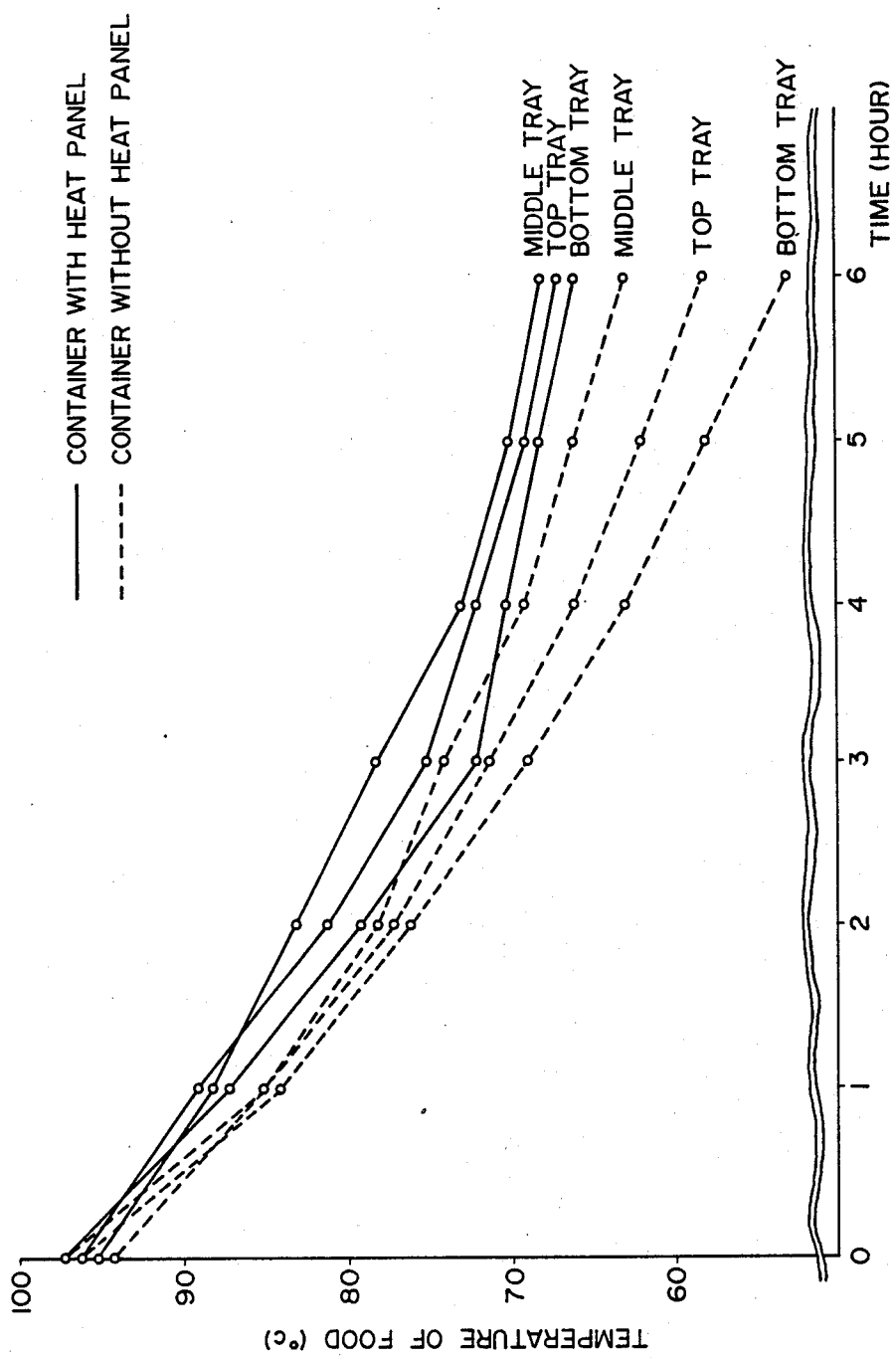
FIG. 9 is a graph showing the results of an insulating test.
Figure 10:
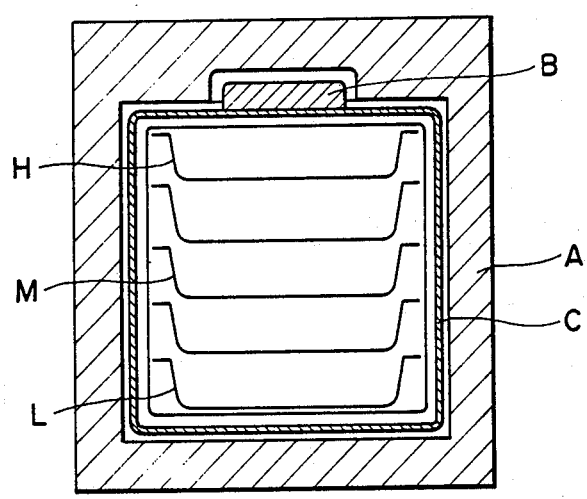
FIG. 10 is a sectional view showing a container of the invention.
Figure 11:
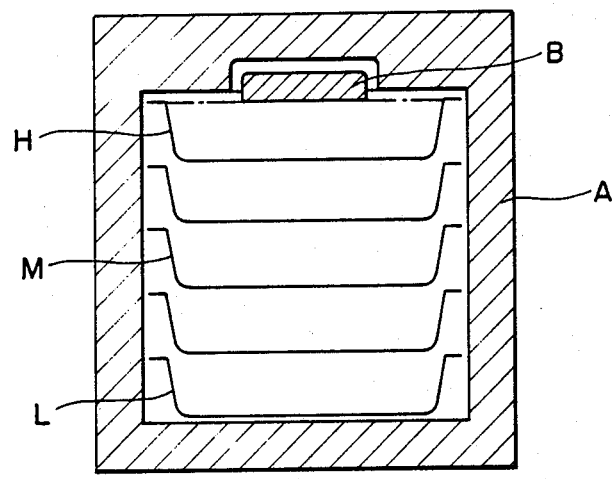
FIG. 11 is a sectional view showing a conventional container.

The container A1 is shown in FIG. 7 and 10, whereas the conventional container A2 is shown in FIG. 8 and 11.

The inner dimension of the containers A1 and A2 used in this comparison test was 170 mm (hight)×150 mm(width)×300 mm (depth) and food was stored in five trays which are piled in each container and there was measured the temperature of each food stored in top tray H, middle tray M and bottom tray L. In the drawings, B is regenerating means for heating (FIGS. 7, 8) or regenerating means for cooling (FIGS. 10, 11) and C is the heat panel.

(1) Keeping - Warm Test:

Heated rice was used for test material.

Regenerating material for heating was one that contains behenic acid as a main content and was disposed in the bottom of the container (shown in FIGS. 7, 8). At that time, the atmospheric temperature was 23° C.

After each test material was stored in each tray in each container, temperature of each test material stored in each tray (H, M, L) was measured every hour until six hours passed.

As can be seen from the results, in the container of the present invention to which the heat panel is attached, there is little difference in the temperature of each food stored in top, middle and bottom trays. After the six-hours, the temperature of each food was maintained over 66° C.

On the contrary in the conventional container without heat panel, the temperature of each food differed from each other.

After the six-hours, the temperature of each food except that in the middle tray fell under 60° C.

As described above, it is apparent that the efficiency of the container of this invention is superior to the conventional container.

(2) Keeping-Cool Test

Cooling jelly was used as test material.

Regenerating material for cooling was used of the type which was frozen at 0° C. and was disposed in the top portion within the container (refers to FIGS. 10, 11). At that time, the atmospheric temperature was 30° C.

Figure 12:
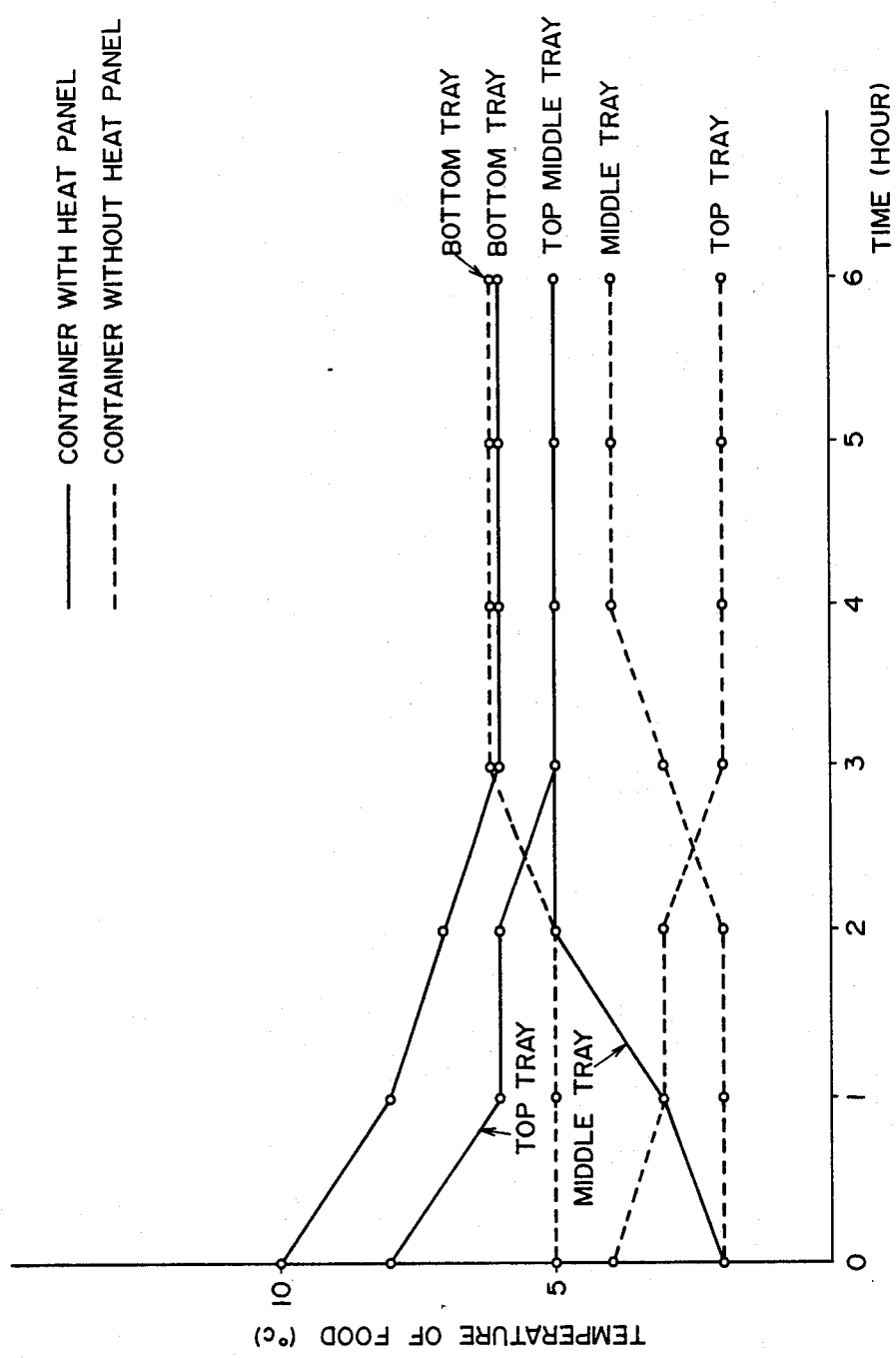
FIG. 12 is a graph showing the results of an insulating test.

After each test material was stored in each tray in each container, temperature of each jelly (test material) stored in each tray (H, M, L) was measured every hour until six hours passed, and obtained were the results shown in FIG. 12.

As can be seen from the results, in the container of the present invention with heat panel, the temperature of each test material was kept constant and the difference in the temperature in each material stored in each tray (H, M, L) was maintained within 1° C.

In comparison with this, in the conventional container, there were produced great differences among the temperatures of the test materials in the top, middle and bottom trays.

In consideration of above mentioned results, it is apparent that the efficiency of the container according to the present invention is superior to the conventional container.

(Example III)

Figure 13:
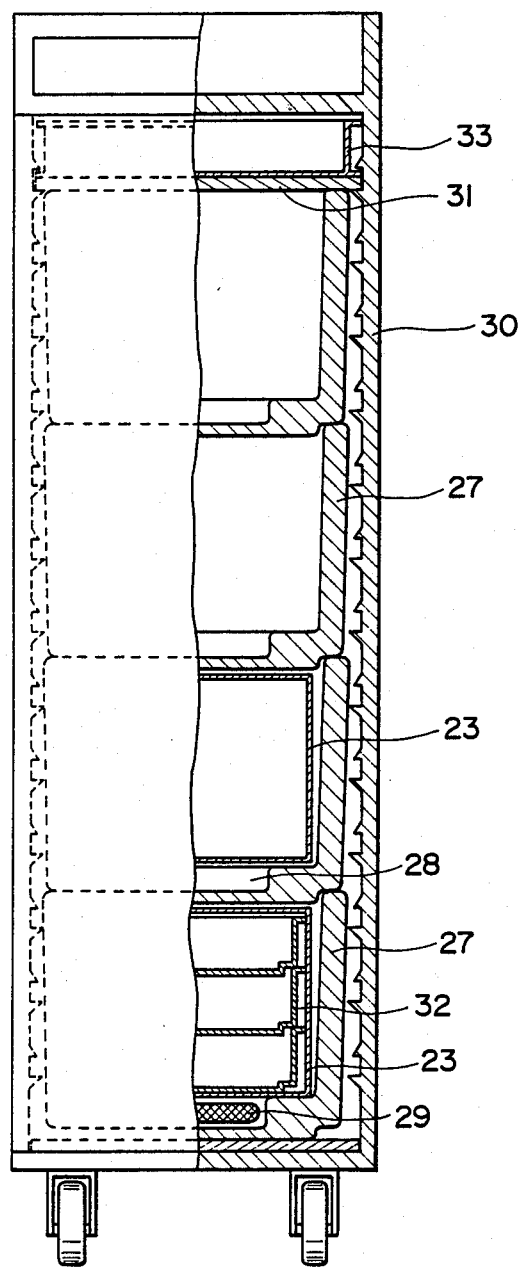
FIG. 13 is a sectional view showing yet another embodiment of the invention.

Next, an embodiment shown in FIG. 13 illustrates the application of the present invention to the container for foods and drinks used in meal service of aircraft etc. In the following description, the same numerals denote the similar elements as in FIGS. 4 and 5.

As shown in the drawing, a concave 28 is set up as a storage room for regenerating means for heating in the bottom portion within a receptacle 27 made of heat-insulating material, one side of which is removably attached thereto.

The regenerating means 29 is stored in said storage room 28.

On the other hand, a panel 23 which is provided with heat-pipes is inserted into the container 27. In the drawing reference numeral 10 denotes cart, numeral 31 a heat-insulating lid, numeral 32 individval trays and numeral 33 a tray for tableware such as knives which which is not necessary to be kept warm.

The above embodiments are intended to be taken into consideration for the explanation of the present invention and not to limit the scope of the present invention. On the contrary, the present invention is defined only by the scope of the claim and it can easily be understood for those in the art to vary and modify the above mentioned embodiments within the scope of the invention.

What is claimed is:

1. A container comprising (a) a lidless receptacle made of insulating material and comprising a bottom having a concave and a plurality of connecting side walls projecting transversely from said bottom, wherein one of said side walls is removably attached to said receptacle by hinge means comprising pins attached to each side end of said removable side wall and projecting transversely in opposing directions therefrom, said pins removably inserted into recesses in side ends of side walls adjacent said removable side wall, and the remaining side walls are fixedly attached to said bottom, and (b) heat regenerating means disposed in said concave and comprising a case packed with heat regenerating material having a solidification point of at least 75° C. and primarily comprised of at least one higher fatty acid, wherein the receptacle bottom of a second identical container placed atop said container forms a lid for said receptacle such that the inside of said receptacle is insulated from the surrounding environment.

2. A container as in claim 1, further comprising a groove in said bottom and a marginal end projecting upwardly from one of said side walls adjacent to said removable side wall such that said marginal end is mated with the groove of an identical container when said identical container is placed atop said container such that the receptacle bottom of said identical container forms a lid for said receptacle such that said receptacle is insulated from the surrounding environment.

3. A container comprising (a) a lidless receptacle made of insulating material and comprising a bottom having a concave and a plurality of connecting side walls projecting transversely from said bottom, wherein one of said side walls is removably attached to an adjacent side wall and the remaining side walls are fixedly attached to said bottom, a groove in said bottom, and a marginal end projecting upwardly from one of said side walls adjacent to said removable side wall such that said marginal end is mated with the groove of an identical container when said identical container is placed atop said container, and (b) heat regenerating means disposed in said concave and comprising a case packed with heat regenerating material having a solidification point of at least 75° C. and primarily comprised of at least one higher fatty acid, wherein the receptacle bottom of a second identical container placed atop said container forms a lid for said receptacle such that the inside of said receptacle is insulated from the surrounding environment, wherein said case is transparent plastic.

4. A container as in claim 3, wherein said heat regenerating material comprises behenic acid and cured castor oil.

* * * * *